(12) United States Patent  (10) Patent No.: US 7,069,879 B1
Wexler  (45) Date of Patent: Jul. 4, 2006

(54) ANIMAL TOENAIL CAP

(76) Inventor: Toby Wexler, 303 Paddington Dr., Lafayette, MS (US) 70508

( * ) Notice: Subject to any disclaimer, the term of this patent is extended or adjusted under 35 U.S.C. 154(b) by 0 days.

(21) Appl. No.: 10/915,899

(22) Filed: Aug. 10, 2004

(51) Int. Cl.
 *A01K 15/00* (2006.01)
(52) U.S. Cl. ..................................... 119/851
(58) Field of Classification Search ............... 119/851; 128/880; 132/73; 2/21; 294/25
See application file for complete search history.

(56) References Cited

U.S. PATENT DOCUMENTS

| 1,066,556 A | * | 7/1913 | Tueckmantel | 602/62 |
| 2,251,551 A | * | 8/1941 | O'Reilly | 2/21 |
| 2,764,166 A | * | 9/1956 | Bogoslowsky | 132/73 |
| 4,892,150 A | * | 1/1990 | Thoman | 168/4 |
| 4,962,731 A |   | 10/1990 | Wexler | 119/851 |
| 4,966,174 A | * | 10/1990 | Stanczak | 132/73 |
| 5,282,276 A | * | 2/1994 | Preiose | 2/21 |
| 6,122,901 A | * | 9/2000 | Schultz et al. | 54/82 |
| 6,659,047 B1 |   | 12/2003 | Gat | 119/851 |
| 6,990,985 B1 | * | 1/2006 | Allen et al. | 132/200 |

\* cited by examiner

*Primary Examiner*—Robert P. Swiatek
(74) *Attorney, Agent, or Firm*—Robert N. Montgomery

(57) ABSTRACT

An improved animal toenail covering sheath having an internal and external claw shape and a method of manufacturing same. The covering including methods for securing the encircling sheath to an animal's claw. The improved covering utilizes an injection molding manufacturing process to produce a toenail encircling sheath having a thick lower portion and a thin upper portion. The sheath further includes textured interior cavity walls and pivotal upper portion sidewall for ease of applying an adhesive and application of the sheath to an animal's claws. Various adhesive application methods are also disclosed for affixing the nail cap to the animal's claws.

16 Claims, 4 Drawing Sheets

ANIMAL TOENAIL CAP

1. FIELD OF THE INVENTION

This invention relates generally to protective polymeric sheathing for animal toenails and more particularly to the manufacture and adaptation of such polymeric sheathings to the animal's nails.

2. GENERAL BACKGROUND

The protective toenail caps, covers, or nail polymeric sheaths, previously disclosed in U.S. Pat. No. 4,962,731, are very small polymeric caps configured to the general shape of an animal's toenail, particularly those of cats and dogs. The flexibility and resilience of the cap's construction material is such that deformation of the cap upon application to the animal's toenail provides a snug fit within limited ranges. It has been found that the most economical and applicable process and material for this application is a vinyl dip molding process developed especially for this process. Although other molding processes such as injection molding, blow molding, etc. were investigated, none proved to be as effective or as economical.

Over time, attempts to improve the durability of the cap have not been very successful as a result of an inability to increase durometer without sacrificing the deforming and resilience capability, thus making the cap harder to fit a variety of toenail sizes.

In addition, use of an adhesive to secure the caps in place on the toenail has been a problem since inception. A method had to be conceived for inducing a fast bonding adhesive into the very narrow opening in the cap at the time of its application to the animal. This was achieved by developing a formulation of cyanoacrylate with a density that allowed the adhesive to flow into the narrow opening through a special flexible funnel fitted to the nozzle of a small adhesive container. Although frequent overflows occur due to inexperienced technicians, this method of adhesive insertion into caps seems to be the most effective method to date. There is also the problem of premature adhesive curing in the containers before use and problems associated with nail cap removal from the animal's toe nail in some cases.

Various methods for controlling adhesive insertion and reducing the time required installing the cap on the animal's toenail have been researched. However, the manufacturing process as discussed above prevents the insertion of a cyanoacrylate adhesive, in its current state of development, during the manufacturing process. All attempts to inject the nail caps with this type of adhesive failed due to pre-curing of the adhesive due to heat associated with the molding process. In addition, several attempts to inject the nail caps after removal from the dip molding process proved to be labor intensive, thus making the process economically prohibitive. Attempts to insert a frangible bead into the caps failed for the same reasons. Manually handling the caps one at a time is too expensive and robotic insertion also proved to be cost prohibitive.

At least one attempt has been made by others to solve the adhesion problem as disclosed by Gat in U.S. Pat. No. 6,659,047. Gat suggested that the adhesive be inserted during the manufacturing process by either injection, insertion of a breakable bead, or by fusing two separate component parts, one of which is designed to contain the adhesive. Gat fails to exhibit a firm grasp of the problems involved in the manufacturing process. Due to the very small size of the cap, it is virtually impossible to perform the sequence suggested by Gat in any reasonably economical manner. Therefore, the search for an improved bonding method continues.

Continuing research efforts have shown promise with regard to the durability of the caps, especially where the caps are applied to dogs. Unlike cat nail caps, dog nail caps remain on the dog's toenail two to three times longer than on cat's toenails. This is due to the sloughing effect of the cat's toenail. As a result of such long duration, dogs generally wear the tips off the cap long before the nail configuration changes sufficiently to loosen the nail cap.

Therefore, a need exists for an improved animal nail cap having better durability, especially for dogs and heavier animals that tend to walk on rough surfaces, and the continuing need to solve the adhesion problems discussed above.

3. SUMMARY OF THE INVENTION

This invention is a new and improved animal toenail cap method of manufacture and methods for securing said cap to an animal's toenail. The improved toenail cap utilizes an injection molding manufacturing process to produce a cap having thick and thin portions, including textured interior walls and hinged wall portions for easy adhesive application and application to the animal's toenail. A method for pre-applying an adhesive to the nail cap is discussed herein, including the sealing of such adhesive to prevent premature curing using a removable vapor barrier before affixing the nail cap to the animal's toenail.

For a further understanding of the nature and objects of the present invention, reference should be made to the following detailed description taken in conjunction with the accompanying drawings, in which, like parts are given like reference numerals, and wherein.

5. DETAILED DESCRIPTION OF THE PREFERRED EMBODIMENT

Figure 1:
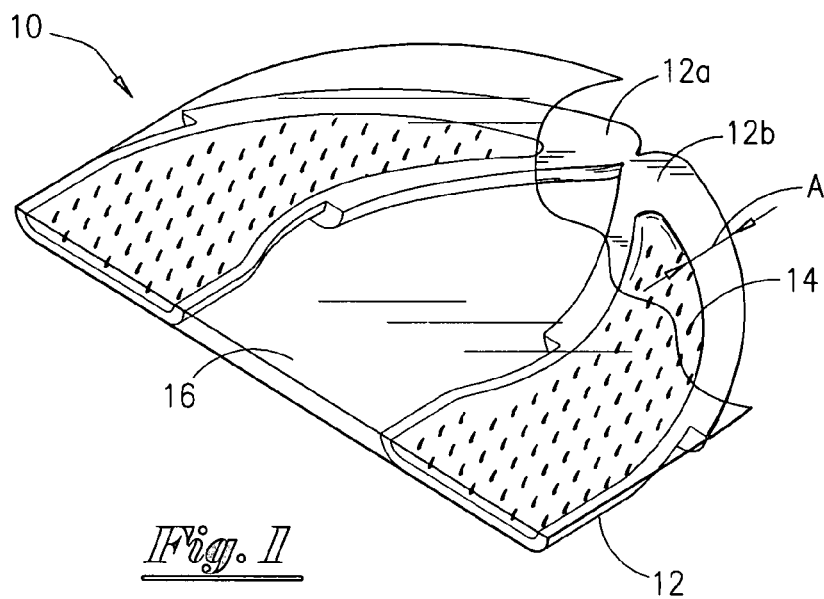
FIG. 1 is an isometric view of a first embodiment of the toenail cap with removable transparent covering.

As previously taught, animal nail caps are currently manufactured by a vinyl dip mold process that is considered the most economical method of manufacture. However, looking first at FIG. 1, we see that the animal nail cap assembly 10 can be injection molded by simply molding the polymeric nail cap 12 in two halves 12a, 12b connected at the tip of each half or in some other manner that allows the two halves to be folded towards each other. In addition, the thickness of the walls "A", unlike the dip mold process, can now be varied at any point, and the interior cavity walls 14 can be embossed or textured to help hold an adhesive.

Figure 2:
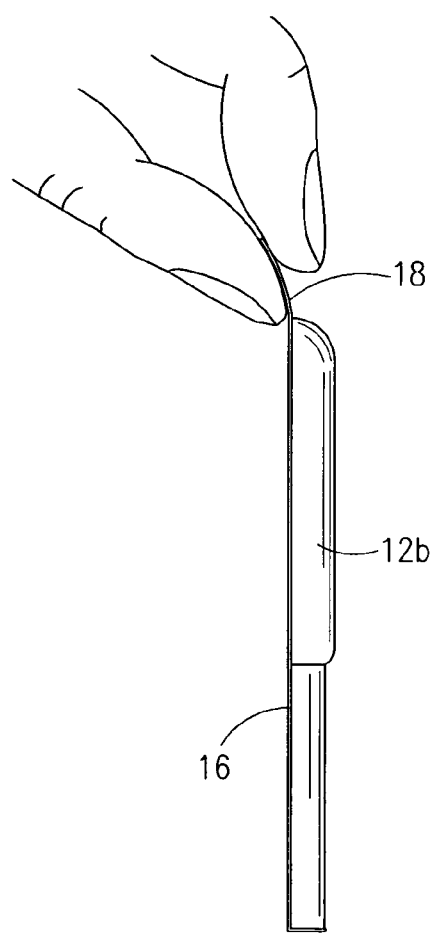
FIG. 2 is a side elevation view of the embodiment shown in FIG. 1.
Figure 3:
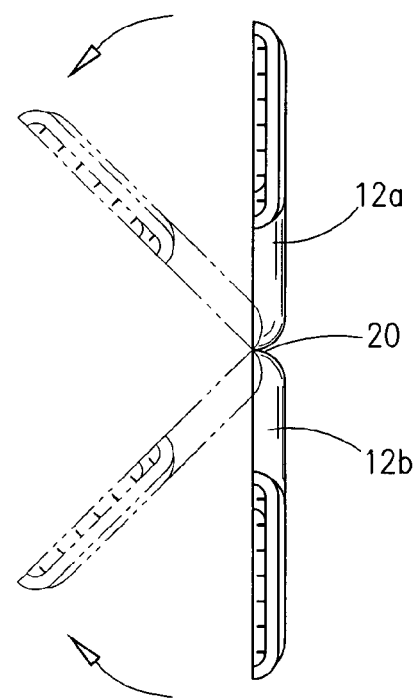
FIG. 3 is an end view of the embodiment shown in FIG. 1 showing hinge movement.
Figure 4:
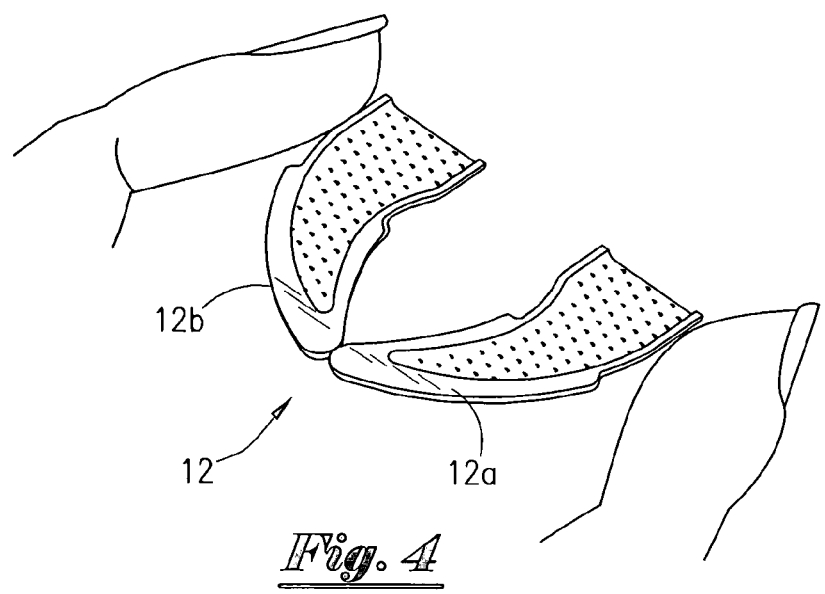
FIG. 4 is a first isometric illustration of the application of the embodiment shown in FIG. 1.
Figure 5:
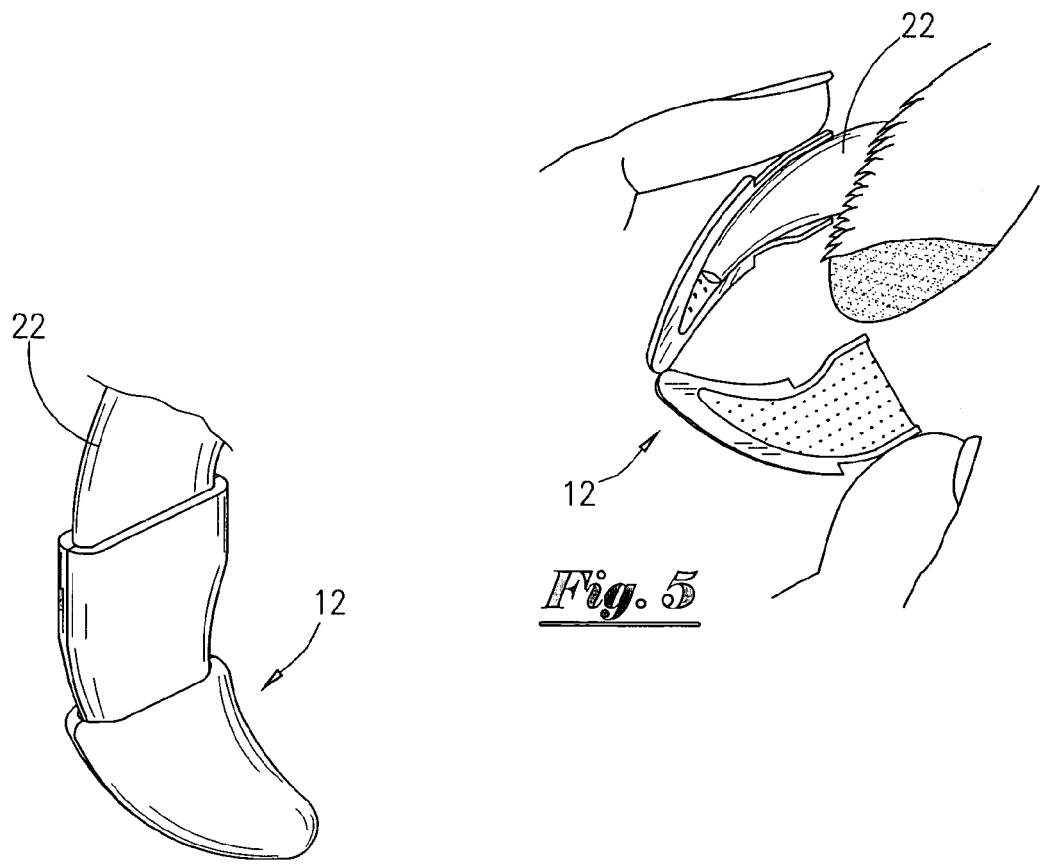
FIG. 5 is a second isometric illustration of the application of the embodiment shown in FIG. 1 being applied around an animal's toenail.
Figure 6:
FIG. 6 is an isometric view of the embodiment shown in FIG. 1 as applied to an animal's toenail.

With the use of automation, an adhesive may be applied to the cavities 14 and covered with a removable vapor barrier 16 that can be peeled off by the technician using tab 18 just prior to application as shown in FIG. 2. With the two halves 12a and 12b connected at the tips forming a hinge point 20 in the form of a tapered, rounded point, the two halves can be pivoted upwards towards each other as shown in phantom in FIG. 3. As seen in FIGS. 4, 5 the nail cap can be held and placed in contact with the animal's toenail by closing the two halves around the toenail 22 and allowing the adhesive in the cap to cure for a few seconds. The cap 12 will then be secured to the nail 22 as shown in FIG. 6 magnified several times.

It has been determined that adhesive need only be applied at the upper portion of the cap since the tips of the animal's toe nails are generally clipped prior to securing the caps in place. Therefore, adhesive located in the tip of the nail cap has no distinct advantage.

Figure 7:
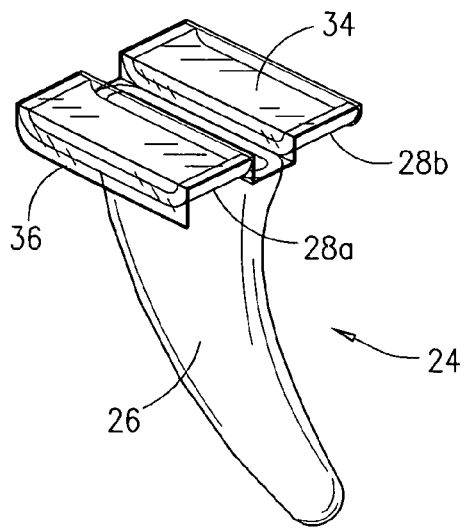
FIG. 7 is an isometric view of a second embodiment of the toenail cap with hinged horizontal sidewalls and applied adhesive.
Figure 8:
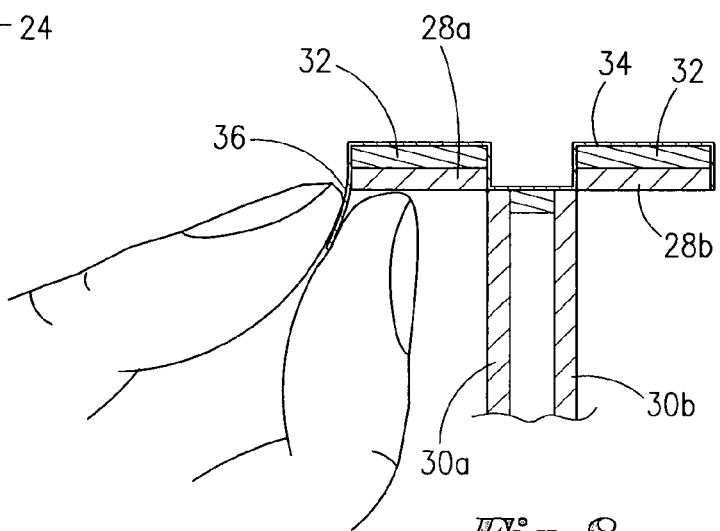
FIG. 8 is a partial cross section view of the second embodiment of the toenail cap with hinged horizontal sidewalls and applied adhesive and removable covering.
Figure 9:
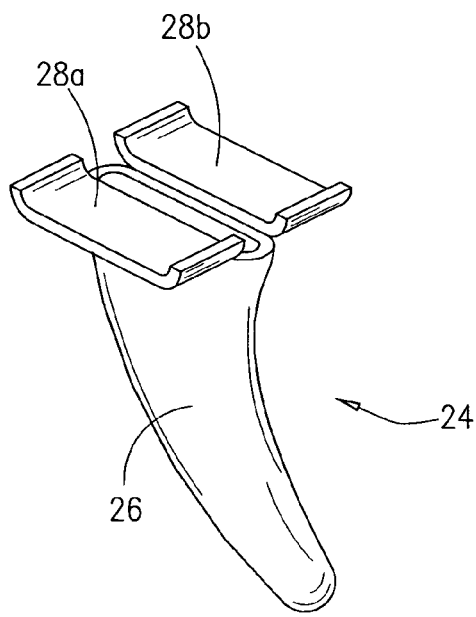
FIG. 9 is an isometric view of the second embodiment of the toenail cap with hinged horizontal sidewalls without applied adhesive and removable covering.

Injection molded nail caps may be formed in a variety of ways such as may be seen in a second embodiment 24 illustrated in FIGS. 7, 9. In this embodiment the upper portion of the nail cap 26 is split into two halves 28a, 28b with one or both of the side walls 30a, 30b, as shown in. FIG. 8, hinged to pivot outwardly perpendicular to the cap. The pivotal portions may be coated with an adhesive 32 and covered with a removable vapor barrier 34, seen in FIG. 7 and FIG. 8, and removed by pulling tab 36.

Figure 10:
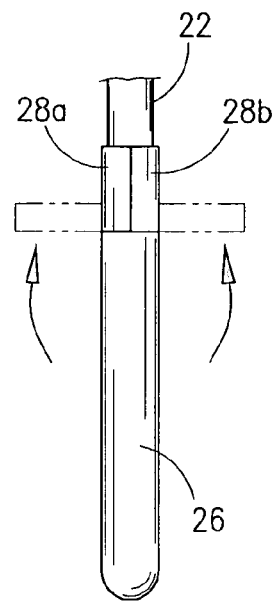
FIG. 10 is an edge view of the second embodiment as applied to the animal's toenail.

The pivotal portions 28a, 28b are pressed into position around the toenail 22 after the nail cap is applied onto the animal's toenail 22 as shown in FIG. 10, thereby making it easier to install the cap 26 on the nail 22.

Figure 11:
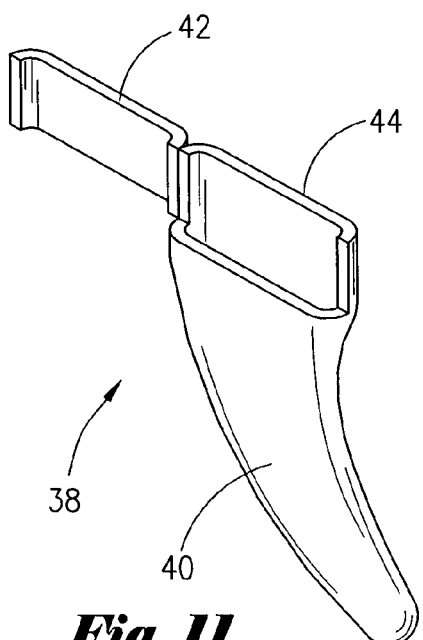
FIG. 11 is an isometric elevation view of the third embodiment of the toenail cap with hinged vertical sidewall without adhesive and covering.
Figure 13:
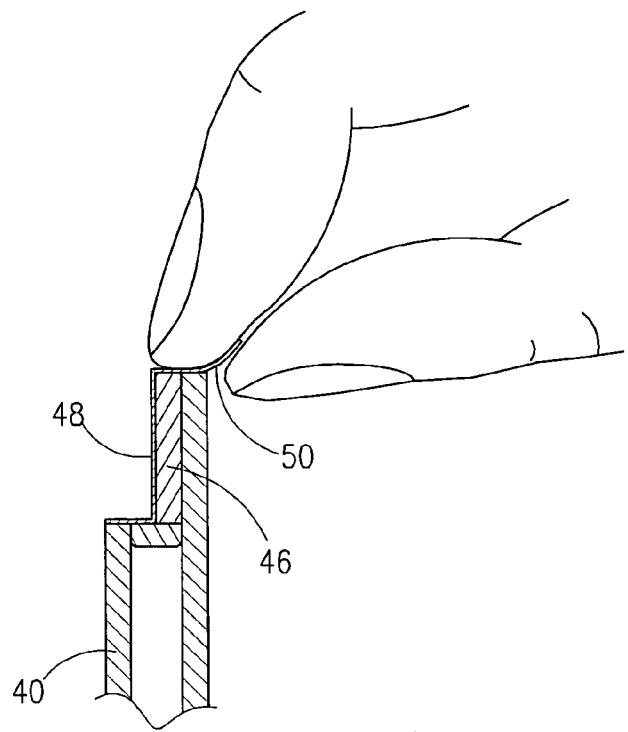
FIG. 13 is a partial cross section view of the third embodiment of the toenail cap with hinged vertical sidewall, applied adhesive and removable covering.
Figure 12:
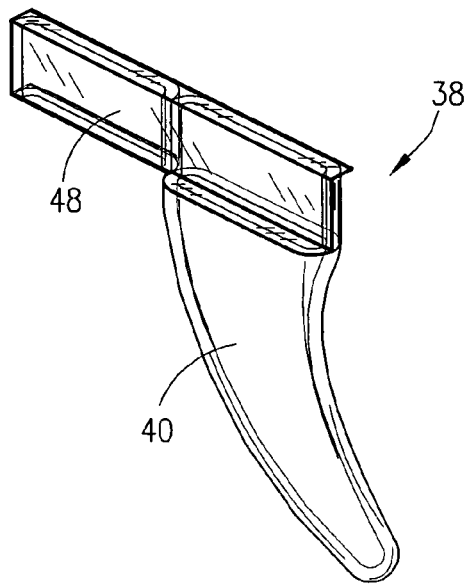
FIG. 12 is an isometric view of a third embodiment of the toenail cap with hinged vertical sidewall, applied adhesive and covering.
Figure 14:
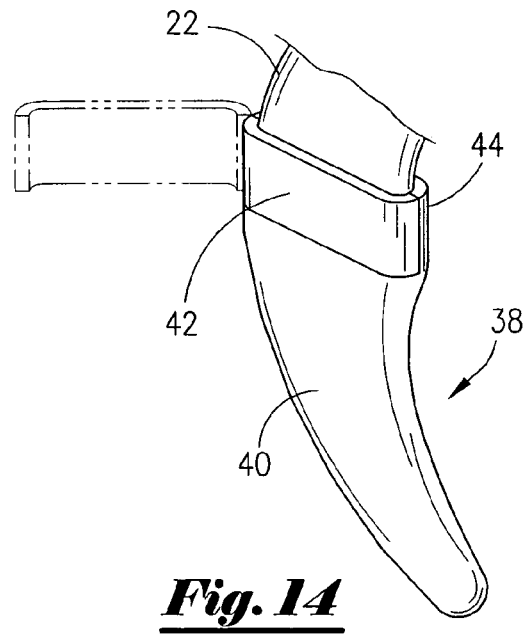
FIG. 14 is an isometric elevation view of the third embodiment of the toenail cap with hinged vertical sidewall as applied to an animal's toenail.

A third embodiment 38 as illustrated in FIG. 11 shows a cap 40 with a vertical pivot or hinge point. In this case, the upper sidewall portions of the cap 40 are split in a manner whereby one sidewall 42 is pivotal or hinged from the opposite side 44. A coating of adhesive 46, seen in FIG. 12 and in cross section in FIG. 13, may be applied to the upper portions 42 and/or 44 and covered with a removable vapor barrier 48, removable by pulling tab 50. When the vapor barrier 48 is removed at point of application, the toenail is inserted within the toenail cap and the pivotal sidewall portion 42 is pressed around the animal's toenail 22 as shown in FIG. 14 and held in position until contact curing is achieved.

A wide variety of adhesive compounds maybe used as described. Two-part adhesives are also anticipated, in which case an inert component can be applied to the nail caps and activated at application by wetting with a second component. Such application may not necessarily require the vapor barrier unless used to prevent loss or degradation of the adhesive component.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An improved animal toenail covering comprising an elongated encircling polymeric sheath having upper and lower portions, said lower portion tapering to a rounded point, and an internal elliptical cavity and external surface shape consistent with that of an animal claw said sheath defining a telescopic relation over an animal claw encasing and providing protection therefrom.

2. The improved animal toenail covering according to claim 1 wherein said upper portion cover is split into two equal halves at least one of said halves being a pivotal sidewall of said upper portion.

3. The improved animal toenail cover covering according to claim 2 further comprising at least one adhesive component applied to an interior portion of said upper portion.

4. The improved animal toenail cover according to claim 3 further comprising a vapor barrier covering said adhesive component.

5. The improved animal toenail covering according to claim 1 wherein said polymeric sheath is molded in a manner whereby each said sidewall of said upper portion is folded perpendicular to said cavity.

6. The improved animal toenail covering according to claim 5 wherein said sheath comprises thick surrounding wall portions defined by said internal cavity and said external surface decreasing progressively in thickness from said lower portion to said upper portion.

7. The improved animal toenail covering according to claim 6 wherein said lower portion is comprised of a polymer having a greater density than said upper portion.

8. The improved animal toenail covering according to claim 1 wherein said upper portion of said sheath is split into two equal halves connected only by a bridge located along one edge.

9. The improved animal toenail covering according to claim 1 wherein said upper portion of said cover sheath comprising a sidewall surrounding said cavity is split in a manner whereby a portion of said sidewall is pivotally connected to an opposing portion of said sidewall.

10. An improved animal toenail covering comprising an injection molded polymeric sheath for encircling an animal claw the sheath being arcuately shaped along its longitudinal axis and having upper and lower portions and an internal cavity and exterior surface shape consistent with that of said animal claw, said cavity defining sidewalls of diminishing thickness extending from said lower portion to said upper portion, said upper portion being spilt in a manner whereby at least a portion of said sidewall is pivotal relative to said cavity.

11. The improved animal toenail covering according to claim 10 wherein said upper portion of said sheath is in a manner whereby a portion of said sidewalls is pivotally connected to an opposing sidewall.

12. The improved animal toenail covering according to claim 10 further comprising at least one adhesive component applied to an interior portion of said upper pivotal portions.

13. The improved animal toenail covering according to claim 12 further comprising a vapor barrier covering said adhesive component.

14. A method for applying an animal toenail covering to an animal having claws comprising the steps of:
a) providing an animal toenail covering comprising a polymeric sheath having an internal cavity and external surface shape consistent with an animal claw defining sidewalls there between for encircling said claw, the sheath having an upper and lower portion with at least a portion of the upper portion having a pivotal portion;
b) insuring the presence of an effective adhesive within at least a portion of said cavity;
c) securing a portion of said toenail cover to said claw, thereby insuring a proper fit; and
d) pressing said pivotal portion into position around said claw for a sufficient period of time to ensure contact curing of said adhesive.

15. The method according to claim 14 for applying an animal toenail covering further comprising the step of removing a vapor barrier using tabs extending beyond the edges of said pivotal portion from said adhesive.

16. The method according to claim 15 for applying an animal toenail cover further comprising the step of applying at least one element of a multi-component adhesive to said upper pivotal portion prior to application of said vapor barrier.

* * * * *